(12) United States Patent
Rajkumar et al.

(10) Patent No.: US 11,087,085 B2
(45) Date of Patent: Aug. 10, 2021

(54) METHOD AND SYSTEM FOR INFERENTIAL DATA MINING (71) Applicant: Tata Consultancy Services Limited, Mumbai (IN)

(72) Inventors: Bhanu Rajkumar, Chennai (IN); Bana Pratap Somi Thulasiraman, Chennai (IN); Sandhyalakshmi Subramanian, Chennai (IN); Dineshkumar Velusamy, Chennai (IN); Selvi Subburaj, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 190 days.

(21) Appl. No.: 16/134,498

(22) Filed: Sep. 18, 2018

(65) Prior Publication Data

US 2019/0087407 A1    Mar. 21, 2019

(30) Foreign Application Priority Data

Sep. 18, 2017 (IN) .............................. 201721033036

(51) Int. Cl.
*G06F 16/27* (2019.01)
*G06F 40/242* (2020.01)
(Continued)

(52) U.S. Cl.
CPC .......... *G06F 40/242* (2020.01); *G06F 16/338* (2019.01); *G06F 16/353* (2019.01);
(Continued)

(58) Field of Classification Search
CPC ........ G06F 16/00; G06F 16/353; G06F 16/36; G06F 40/242; G06F 16/338; G06N 5/04; G06N 5/045; G06N 20/00
(Continued)

(56) References Cited

U.S. PATENT DOCUMENTS 7,099,880 B2 *  8/2006  Arning ................ G06F 16/2465
7,349,919 B2 *  3/2008  Russell ................ G06F 16/285
(Continued)

OTHER PUBLICATIONS

Dey et al.:Opinion Mining From Noisy Text Data, AD '08, Jul. 24, 2008 Singapore (Year: 2008).*

*Primary Examiner* — Kuen S Lu
(74) *Attorney, Agent, or Firm* — Finnegan, Henderson, Farabow, Garrett & Dunner, LLP (57) ABSTRACT

A system and method for inferential mining comprising a learning module to receive a predetermined dataset for generating at least one inference report and clean the received dataset using a cleaning dictionary and anthology dictionary to generate a cleansed data, a priority mapping module to associate a priority with each of the cleansed data, a classifying module to classify each of the cleansed data in a plurality of buckets, a grouping module to group each of the plurality of buckets to generate all combinations of each of the cleansed data in each of the plurality of buckets, a comparing module to compare the generated all possible combinations of each of the cleansed data to a clustering dictionary to identify insights associated with the cleansed data and a report generation module configured to generate an inference report for identified insights by matching the identified insights to a solution dictionary.

13 Claims, 4 Drawing Sheets

(51) Int. Cl.
- *G06N 5/04* (2006.01)
- *G06F 16/36* (2019.01)
- *G06F 16/338* (2019.01)
- *G06F 16/35* (2019.01)
- *G06N 20/00* (2019.01)
- *G06F 16/00* (2019.01)

(52) U.S. Cl.
CPC ............... *G06F 16/36* (2019.01); *G06N 5/04* (2013.01); *G06N 5/045* (2013.01); *G06F 16/00* (2019.01); *G06N 20/00* (2019.01)

(58) Field of Classification Search
USPC .......................................................... 715/737
See application file for complete search history.

(56) References Cited

U.S. PATENT DOCUMENTS

| | | | |
|---|---|---|---|
| 2002/0129342 A1* | 9/2002 | Kil | G06F 16/2465 717/137 |
| 2006/0136462 A1* | 6/2006 | Campos | G06F 16/285 |
| 2015/0200967 A1* | 7/2015 | Redlich | G06F 16/282 726/1 |
| 2017/0060972 A1* | 3/2017 | McHugh | G06F 16/258 |
| 2018/0095814 A1* | 4/2018 | Patil | G06F 11/0709 |
| 2019/0155831 A1* | 5/2019 | Indeck | G06F 16/284 |

\* cited by examiner

METHOD AND SYSTEM FOR INFERENTIAL DATA MINING

PRIORITY CLAIM

This U.S. patent application claims priority under 35 U.S.C. § 119 to: India Application No. 201721033036, filed on Sep. 18, 2017. The entire contents of the aforementioned application are incorporated herein by reference.

TECHNICAL FIELD

The present invention generally relates to the field of data analysis and visualization. More specifically, this invention relates to a method and system for inferential data mining.

BACKGROUND OF THE INVENTION

In modern world of technology, the production of data is increasing at a rampant rate. The increased production of data increases the demand for collection, storage, analysis and presentation of data at a faster rate with appropriate understanding, reasoning and decision making. Proper analysis and presentation of data enable a user to understand relevance and usefulness of the information contained in data and to take efficient data-driven decisions.

Data analytics and visualization provides presentation of information with an objective of providing a user with a qualitative understanding of any machine data. Furthermore, data analytics and visualization is the combination of automated analysis techniques and interactive visualization for very large and complex sets of data. The overall goal of the mining process is to extract information from a set of raw data and transform it into an understandable structure for further use.

The existing methods of data analytics and visualization assists the user to monitor and analyse raw data, however, efficient processing becomes difficult on certain streams of data such as random log and dump values owing to nature of data. Also, another reason for inefficient data mining is the lack of interface to provide intelligence for proper processing. The application of static capability to create various interpretations and inferences fails to provide clarity on the expectation of the end user out of the raw data. Most traditional mining methodologies are single centric and lacks the capturing of correct correlation between different data.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for generating at least one inference report for a predetermined dataset.

The present application provides a computer implemented method for generating at least one inference report for a predetermined dataset comprising processor implemented steps of receiving the predetermined dataset for generating at least one inference report using a learning module (210), wherein the predetermined dataset comprises unstructured data. The method further comprises cleaning the received dataset by the learning module (210) using a cleaning dictionary (222) and anthology dictionary (224) to generate a cleansed data. In an embodiment the anthology dictionary (224) comprises all English language words and the cleaning dictionary (222) comprises details of words to be removed during cleaning. The disclosed method further comprises the step of associating a priority with each of the cleansed data using a priority mapping module (212) wherein priority is based on a predefined priority stored in a priority dictionary (226) and classifying each of the cleansed data in a plurality of buckets using a classifying module (214), based on the priority associated with each of the cleansed data. The method further comprises grouping each of the plurality of buckets to generate all possible combinations of each of the cleansed data in each of the plurality of buckets using a grouping module (216) and comparing the generated all possible combinations of each of the cleansed data to a clustering dictionary (228) to identify insights associated with the cleansed data using a comparing module (218). In one embodiment of the disclosed subject matter the clustering dictionary (228) comprises predefined observations. Finally the disclosed method involves the step of generating at least one inference report for identified insights by matching the identified insights to a solution dictionary (230) using a report generation module (220) wherein the solution dictionary (230) comprises domain based catalog and service based catalog with appropriate suggestions for predefined observations.

In another aspect, the present application provides a system (102), the system (102) comprises a processor (202), a user interface (204), and a memory (206) coupled to the processor comprising a learning module (210) configured to receive the predetermined dataset for generating at least one inference report. In an embodiment of the subject matter disclosed herein the predetermined dataset comprises unstructured data. Further the learning module (210) is configured to clean the received dataset using a cleaning dictionary (222) and anthology dictionary (224) to generate a cleansed data. According to an aspect of the disclosed subject matter the anthology dictionary (224) comprises all English language words and the cleaning dictionary (222) comprises details of words to be removed during cleaning. The system (102) disclosed herein also comprises a priority mapping module (212) which is configured to associate a priority with each of the cleansed data wherein priority is based on a predefined priority stored in a priority dictionary (226). Further the system comprises a classifying module (214) configured to classify each of the cleansed data in a plurality of buckets based on the priority associated with each of the cleansed data and a grouping module (216) configured to group each of the plurality of buckets to generate all possible combinations of each of the cleansed data in each of the plurality of buckets. Further in another aspect the system (102) comprises a comparing module (218) configured to compare the generated all possible combinations of each of the cleansed data to a clustering dictionary (228) to identify insights associated with the cleansed data wherein in one aspect the clustering dictionary (228) comprises predefined observations; and a report generation module (220) configured to generate at least one inference report for identified insights by matching the identified insights to a solution dictionary (230) wherein the solution dictionary (230) comprises domain based catalog and service based catalog with appropriate suggestions for predefined observations.

In another embodiment herein provides one or more non-transitory machine readable information storage mediums comprising one or more instructions, which when executed by one or more hardware processors perform actions providing a system (102), the system (102) comprises a processor (202), a user interface (204), and a memory (206) coupled to the processor comprising a learning module (210) configured to receive the predetermined dataset for generating at least one inference report. In an embodiment of the subject matter disclosed herein the predetermined dataset comprises unstructured data. Further the learning module (210) is configured to clean the received dataset using a cleaning dictionary (222) and anthology dictionary (224) to generate a cleansed data. According to an aspect of the disclosed subject matter the anthology dictionary (224) comprises all English language words and the cleaning dictionary (222) comprises details of words to be removed during cleaning. The system (102) disclosed herein also comprises a priority mapping module (212) which is configured to associate a priority with each of the cleansed data wherein priority is based on a predefined priority stored in a priority dictionary (226). Further the system comprises a classifying module (214) configured to classify each of the cleansed data in a plurality of buckets based on the priority associated with each of the cleansed data and a grouping module (216) configured to group each of the plurality of buckets to generate all possible combinations of each of the cleansed data in each of the plurality of buckets. Further in another aspect the system (102) comprises a comparing module (218) configured to compare the generated all possible combinations of each of the cleansed data to a clustering dictionary (228) to identify insights associated with the cleansed data wherein in one aspect the clustering dictionary (228) comprises predefined observations; and a report generation module (220) configured to generate at least one inference report for identified insights by matching the identified insights to a solution dictionary (230) wherein the solution dictionary (230) comprises domain based catalog and service based catalog with appropriate suggestions for predefined observations.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the inferential data mining system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

Figure 1:
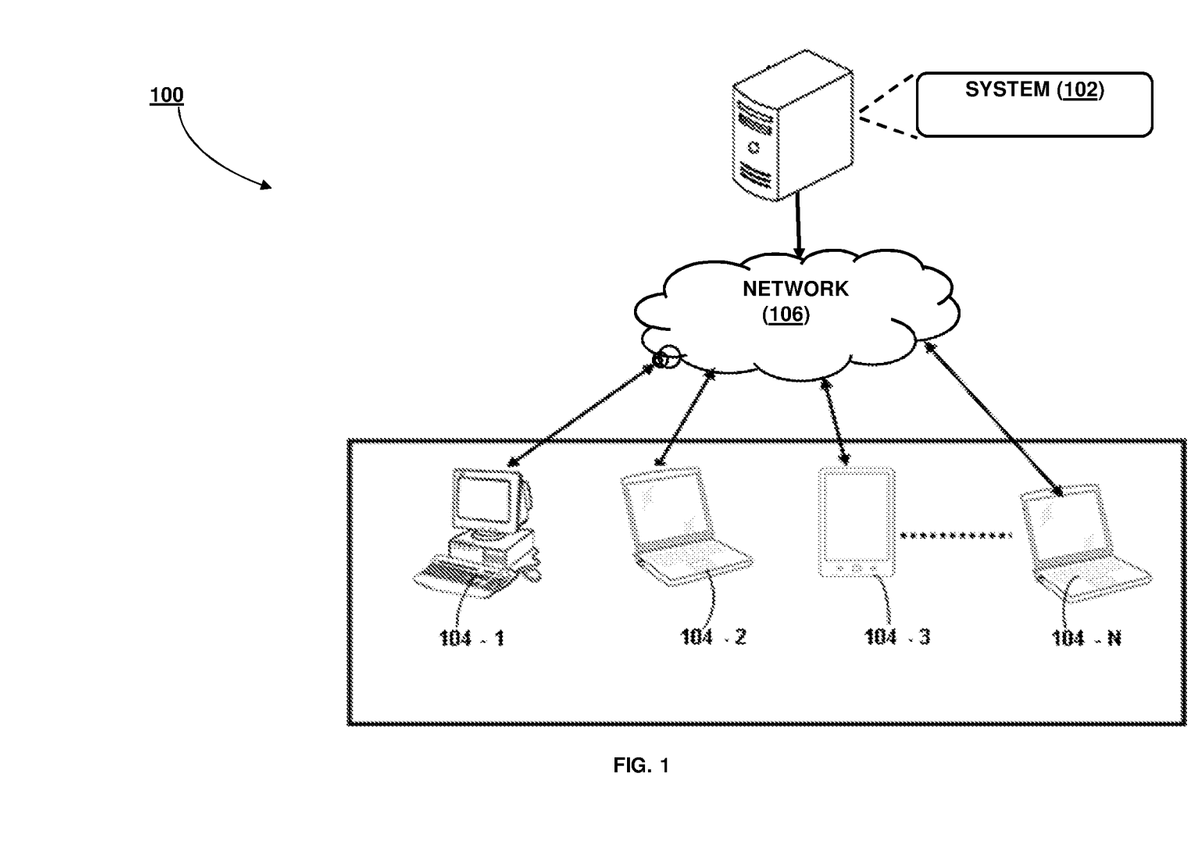
FIG. 1 illustrates a network implementation of a system for generating at least one inference report for a predetermined dataset, in accordance with an embodiment of the present subject matter.

The present application provides a computer implemented method and system for inferential mining of data. The instant application discloses method and system to generate inference reports and analytical reports. Referring now to FIG. 1, a network implementation 100 of a system 102 for generating at least one inference report for a predetermined dataset is illustrated, in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer protocol over SSL (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
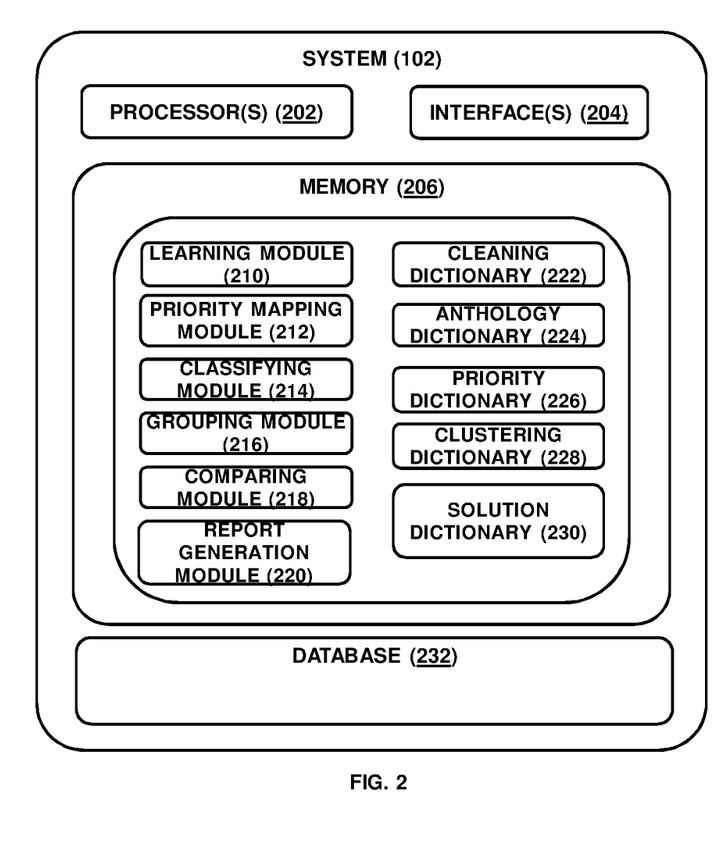
FIG. 2 shows block diagrams illustrating the system for generating at least one inference report for a predetermined dataset, in accordance with an embodiment of the present subject matter.

In one embodiment the present invention, referring to FIG. 2, a detailed working of the various components of the system 102 is illustrated.

In one aspect in accordance with the architecture illustrated in FIG. 2, the system 102 comprises a processor (202), a user interface (204), and a memory (206) coupled to the processor comprising a learning module (210) configured to receive the predetermined dataset for generating at least one inference report. In an embodiment of the subject matter disclosed herein the predetermined dataset comprises unstructured data. In another embodiment the received predetermined dataset is loaded dynamically such that a template is created to load the predetermined dataset. Further the learning module (210) is configured to clean the received dataset using a cleaning dictionary (222) and anthology dictionary (224) to generate a cleansed data. According to an aspect of the disclosed subject matter the anthology dictionary (224) comprises all English language words and the cleaning dictionary (222) comprises details of words to be removed during cleaning.

The system (102) disclosed herein also comprises a priority mapping module (212) which is configured to associate a priority with each of the cleansed data wherein priority is based on a predefined priority stored in a priority dictionary (226). Further the system comprises a classifying module (214) configured to classify each of the cleansed data in a plurality of buckets based on the priority associated with each of the cleansed data and a grouping module (216) configured to group each of the plurality of buckets to generate all possible combinations of each of the cleansed data in each of the plurality of buckets.

The system (102) further comprises a comparing module (218) configured to compare the generated all possible combinations of each of the cleansed data to a clustering dictionary (228) to identify insights associated with the cleansed data wherein in one aspect the clustering dictionary (228) comprises predefined observations; and a report generation module (220) configured to generate at least one inference report for identified insights by matching the identified insights to a solution dictionary (230) wherein the solution dictionary (230) comprises domain based catalog and service based catalog with appropriate suggestions for predefined observations.

In an embodiment of the disclosed invention, the learning from any issues and the collated collective issues from input data are termed insights. Insights provides information about each issue including issues nature, background, correlation, impact and the like. Further insights facilitates to determine the most accurate steps to address the issues.

Further in another embodiment the system (102) learns continuously on the go and keeps all the dictionaries updated. This learning is termed as predefined observations which are acquired by the system (102) and facilitating analytics.

In another aspect referring to FIG. 2 the system (102) further comprises a database (232) and interface (204) such that the learning module (210) may further be configured to store in the database (232), the received predetermined dataset and the inference reports generated for said received predetermined dataset; and the interface (204) to display the inference reports to a user when second similar predetermined dataset is received by the system.

In an embodiment of the system (102) disclosed herein the learning module (210) may update one or more dictionaries based on previous instances of running of system. In another aspect the learning module (210) may monitor each time a dataset is run to generate inference report, the learning module (210) may further monitor updates provided by a user and based on such monitoring update the one or more dictionaries accordingly.

Figure 3A:
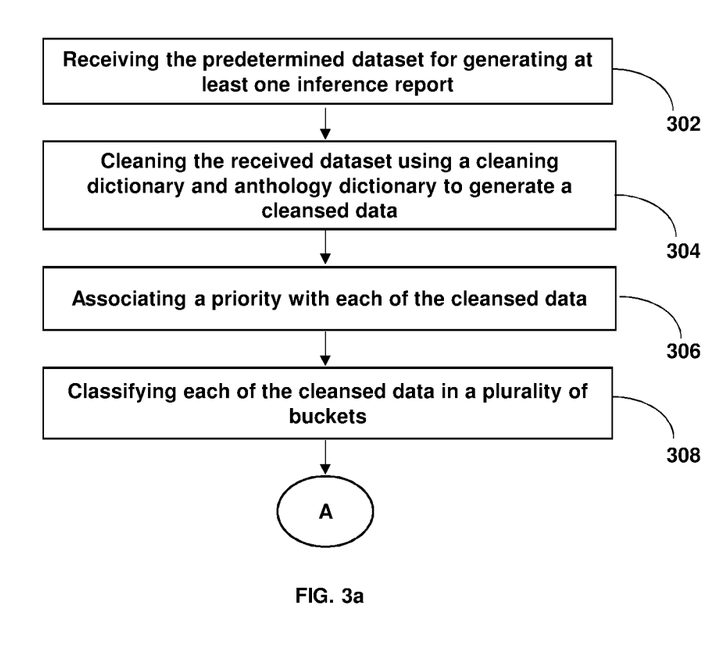
FIG. 3a shows a flow chart illustrating the method for generating at least one inference report for a predetermined dataset in accordance with an embodiment of the present subject matter.
Figure 3B:
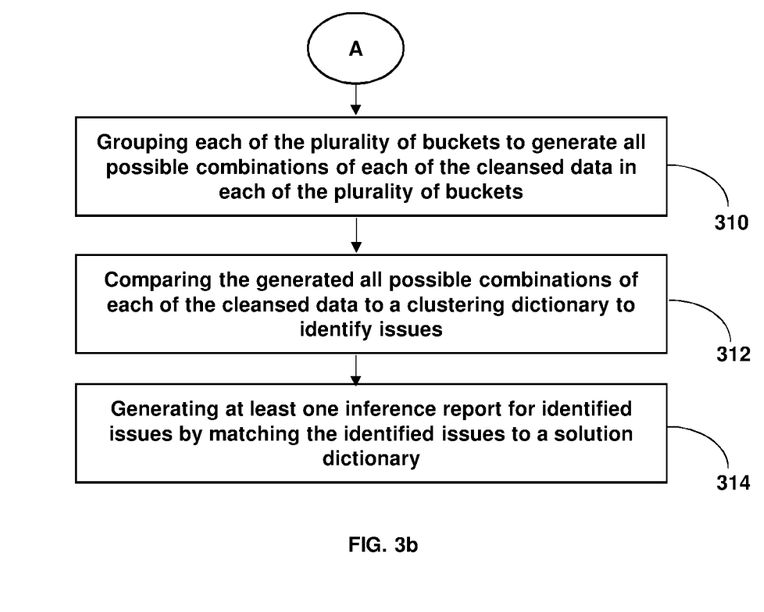
FIG. 3b shows a flow chart illustrating the steps for generating at least one inference report for a predetermined dataset, in accordance with an embodiment of the present subject matter.

Referring now to FIGS. 3a & 3b flow chart illustrating the steps for generating at least one inference report for a predetermined dataset is illustrated. At the step 302 a predetermined dataset for generating at least one inference report is received. In an embodiment the received predetermined dataset is loaded dynamically such that a template is created to load the predetermined dataset. In another embodiment of the subject matter disclosed herein the predetermined dataset comprises unstructured data.

At the step 304 the received dataset is cleaned using a cleaning dictionary and anthology dictionary to generate a cleansed data. In an embodiment wherein the anthology dictionary comprises all English language words and the cleaning dictionary comprises details of words to be removed during cleaning.

At the step 306 a priority is associated with each of the cleansed data. In one aspect of the subject matter disclosed herein priority is based on a predefined priority stored in a priority dictionary.

At the step 308 each of the cleansed data are classified in a plurality of buckets. In an embodiment the classification may be based on the priority associated with each of the cleansed data At the step 310 each of the plurality of buckets are grouped to generate all possible combinations of each of the cleansed data in each of the plurality of buckets.

At the step 312 the generated all possible combinations of each of the cleansed data is compared to a clustering dictionary to identify insights associated with the cleansed data, In an aspect the clustering dictionary may comprise predefined observations.

At the step 314 at least one inference report for identified insights is generated. In an embodiment the at least one inference report may be generated by matching the identified insights to a solution dictionary. In another embodiment the at least one inference report comprises one or more analytical report providing appropriate recommendations. The appropriate recommendations may be based on the data stored in the solutioning dictionary.

In an embodiment the user may be enabled to make changes in the preexisting templates and data stored in the system wherein the user may select, deselect and create templates suitable to the needs of the users wherein the predetermined data is then uploaded in such templates and used for generating inference and analytical reports.

The following paragraphs contains certain definitions and descriptions which are intended for the sole purpose of understanding the invention and should in no way be considered to limit the scope of the instant disclosure. The scope of the instant disclosure may only be defined based on the claim set following the detailed description.

The disclosed system handles the computational process of discovering patterns in large data sets involving methods at the intersection of machine learning, statistics, and Expert inputs. The system and method disclosed herein extract information from a data set and transform it into an understandable structure for further use.

The system disclosed takes inputs from each and every data set that is introduced in to the system. In an embodiment the system disclosed herein also incorporates manual knowledge feed.

The system comprises several dictionaries to generate inference reports based on the data. The dictionaries include a) Cleaning Dictionary—Contains information on which words to be removed (Fillers and Names) b) Anthology Dictionary—Standard English dictionary containing anthology of all words c) Priority Dictionary—Contains all relevant terms with priority value for the same d) Clustering Dictionary—Contains various combination of bucketed insights e) Solution Dictionary—Extensive domain based catalog and service based catalog with appropriate suggestions for all bucketed insights.

These dictionaries are used in accordance with the method disclosed herein to generate inference and analytical reports. Exemplarily steps for the same are disclosed under, however these steps are illustrative and may not be taken to limit the scope of the instant invention.

Firstly an Identified field from the raw data is matched against the Cleaning and Anthology dictionary in a cleaning process. This helps in removing non English words, names, fillers like ok, ah, are etc. and other irrelevant information from the data set.

Once the cleaning process is complete, the data is then grouped into different buckets in order of each word's priority. This enables to understand the relevant importance of each identified terminology and helps in narrowing down the exact issue.

The next step involves taking a threshold value to identify the word level combinations to be generated. This generates all possible combinations using the bucket values. In this step the data combinations are compared against the Clustering dictionary and identifies the best fit. In one embodiment these system grouped combinations will be represented in terms of volume based on entire data.

In the next step the bucketed insights is matched with the respective Solution dictionary to identify a designated recommendation for each item. This may be done across various domain based catalog and service based catalog (DB, Server, Backup etc.) and upon match (Based on different parameters), it may be scanned against the solutions dictionary to find out the recommendation category.

In one embodiment the final data may be displayed as series of reports that show the various inferences after mining to understand the spread of issues across environment. The system may also generate suggestive reports that help in understanding methods for minimizing the respective issues and proactive prevention of the same.

In an embodiment where new data sets may not match with the respective dictionaries and such data sets may be evaluated by an expert. The inputs by the expert may be stored by the system and may be used by the learning module to update the dictionaries with accurate information.

We claim:

1. A method for generating at least one inference report for a predetermined dataset, the method comprising processor implemented steps of:

receiving the predetermined dataset for generating at least one inference report using a learning module, wherein the predetermined dataset comprises unstructured data;

cleaning the received dataset by the learning module using a cleaning dictionary and anthology dictionary to generate a cleansed data wherein the anthology dictionary comprises all English language words and the cleaning dictionary comprises details of words to be removed during cleaning;

associating a priority with each of the cleansed data using a priority mapping module wherein priority is based on a predefined priority stored in a priority dictionary;

classifying each of the cleansed data in a plurality of buckets using a classifying module, based on the priority associated with each of the cleansed data to narrow down an issue;

grouping each of the plurality of buckets to generate all possible combinations of each of the cleansed data in each of the plurality of buckets using a grouping module by taking a threshold value to identify word level combinations, wherein the generated possible combinations are represented in terms of volume based on entire data;

comparing the generated all possible combinations of each of the cleansed data to a clustering dictionary to identify insights associated with the cleansed data using a comparing module, wherein the clustering dictionary comprises predefined observations, wherein the insights refer to learning from issues and collated collective issues from the predetermined dataset, and provide information about nature of the issue, background of the issue, correlation of the issues, and impact of the issue, and wherein the insights facilitate to determine most accurate steps to address the issue;

generating at least one inference report for identified insights by matching the identified insights to a solution dictionary using a report generation module wherein the solution dictionary comprises domain based catalog and service based catalog with appropriate suggestions for predefined observations;

displaying the at least one inference report that shows inferences after mining to understand spread of issues across environment;

generating suggestive reports that help in understanding method for minimizing issues and proactive prevention of the issues; and continuously learn and update at least one of the cleaning dictionary, the anthology dictionary, the priority dictionary, the clustering dictionary, or the solution dictionary by monitoring the predetermined data set when the predetermined data set is run to generate the at least one inference report.

2. The method according to claim 1 further comprising:
storing in a database, using the learning module the received predetermined dataset and the inference reports generated for said received predetermined dataset;
displaying, using a interface, the inference reports to a user when a second similar predetermined dataset is received by the system.

3. The method according to claim 1 wherein the received predetermined dataset is loaded dynamically such that a template is dynamically created to load the predetermined dataset.

4. The method according to claim 1 wherein the generated at least one inference report comprises one or more analytical report providing appropriate recommendations.

5. A system for generating at least one inference report for a predetermined dataset comprising a processor, a memory coupled to said processor comprising:
a learning module configured to receive the predetermined dataset for generating at least one inference report, wherein the predetermined dataset comprises unstructured data;
the learning module further configured to clean the received dataset using a cleaning dictionary and anthology dictionary to generate a cleansed data, wherein the anthology dictionary comprises all English language words and the cleaning dictionary comprises details of words to be removed during cleaning;
a priority mapping module configured to associate a priority with each of the cleansed data wherein priority is based on a predefined priority stored in a priority dictionary;
a classifying module configured to classify each of the cleansed data in a plurality of buckets based on the priority associated with each of the cleansed data to narrow down an issue;
a grouping module configured to group each of the plurality of buckets to generate all possible combinations of each of the cleansed data in each of the plurality of buckets by taking a threshold value to identify word level combinations, wherein the generated possible combinations are represented in terms of volume based on entire data;
a comparing module configured to compare the generated all possible combinations of each of the cleansed data to a clustering dictionary to identify insights associated with the cleansed data wherein the clustering dictionary comprises predefined observations, wherein the insights refer to learning from issues and collated collective issues from the predetermined dataset, and provide information about nature of the issue, background of the issue, correlation of the issues, and impact of the issue, and wherein the insights facilitate to determine most accurate steps to address the issue;
a report generation module configured to:
generate at least one inference report for identified insights by matching the identified insights to a solution dictionary wherein the solution dictionary comprises domain based catalog and service based catalog with appropriate suggestions for predefined observations;
displaying the at least one inference report that shows inferences after mining to understand spread of issues across environment;
generating suggestive reports that help in understanding method for minimizing issues and proactive prevention of the issues; and
the learning module is further configured to continuously learn and update at least one of the cleaning dictionary, the anthology dictionary, the priority dictionary, the clustering dictionary, or the solution dictionary by monitoring the predetermined data set when the predetermined data set is run to generate the at least one inference report.

6. The system according to claim 5 further comprising:
the learning module further configured to store in a database, the received predetermined dataset and the inference reports generated for said received predetermined dataset; and
an interface to display the inference reports to a user when second similar predetermined dataset is received by the system.

7. The system according to claim 5, configured to receive predetermined dataset wherein the predetermined dataset is loaded dynamically and a template is dynamically created to load the predetermined dataset.

8. The system according to claim 5, wherein the at least one inference report generated by the report generation module comprises one or more analytical report providing appropriate recommendations.

9. The system according to claim 5, wherein the learning module is further configured to update one or more of the cleaning dictionary, anthology dictionary, priority dictionary, clustering dictionary and solution dictionary based on monitoring one or more previous instance of generating at least one inference reports.

10. One or more non-transitory machine readable information storage mediums comprising one or more instructions which when executed by one or more hardware processors cause:
receiving the predetermined dataset for generating at least one inference report using a learning module, wherein the predetermined dataset comprises unstructured data;
cleaning the received dataset by the learning module using a cleaning dictionary and anthology dictionary to generate a cleansed data wherein the anthology dictionary comprises all English language words and the cleaning dictionary comprises details of words to be removed during cleaning;
associating a priority with each of the cleansed data using a priority mapping module wherein priority is based on a predefined priority stored in a priority dictionary;
classifying each of the cleansed data in a plurality of buckets using a classifying module, based on the priority associated with each of the cleansed data to narrow down an issue;
grouping each of the plurality of buckets to generate all possible combinations of each of the cleansed data in each of the plurality of buckets using a grouping module by taking a threshold value to identify word level combinations, wherein the generated possible combinations are represented in terms of volume based on entire data;
comparing the generated all possible combinations of each of the cleansed data to a clustering dictionary to identify insights associated with the cleansed data using a comparing module, wherein the clustering dictionary comprises predefined observations, wherein the insights refer to learning from issues and collated collective issues from the predetermined dataset, and provide information about nature of the issue, background of the issue, correlation of the issues, and impact of the issue, and wherein the insights facilitate to determine most accurate steps to address the issue;
generating at least one inference report for identified insights by matching the identified insights to a solution dictionary using a report generation module wherein the solution dictionary comprises domain based catalog and service based catalog with appropriate suggestions for predefined observations;
displaying the at least one inference report that shows inferences after mining to understand spread of issues across environment;
generating suggestive reports that help in understanding method for minimizing issues and proactive prevention of the issues; and
continuously learn and update at least one of the cleaning dictionary, the anthology dictionary, the priority dictionary, the clustering dictionary, or the solution dictionary by monitoring the predetermined data set when the predetermined data set is run to generate the at least one inference report.

11. The one or more non-transitory machine readable information storage mediums of claim 10, further comprising:
storing in a database, using the learning module the received predetermined dataset and the inference reports generated for said received predetermined dataset;
displaying, using a interface, the inference reports to a user when a second similar predetermined dataset is received by the system.

12. The one or more non-transitory machine readable information storage mediums of claim 10, wherein the received predetermined dataset is loaded dynamically such that a template is dynamically created to load the predetermined dataset.

13. The one or more non-transitory machine readable information storage mediums of claim 10, wherein the generated at least one inference report comprises one or more analytical report providing appropriate recommendations.

* * * * *